June 18, 1929.　　　F. W. PEEK, JR　　　1,717,850
ELECTRIC DISCHARGE DEVICE
Filed Dec. 19, 1925　　　3 Sheets-Sheet 1
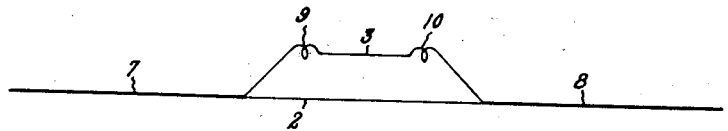
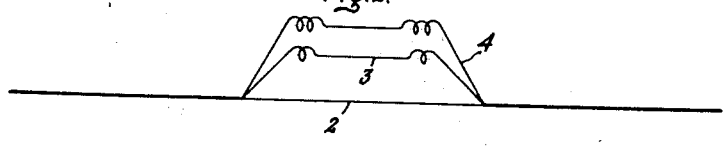
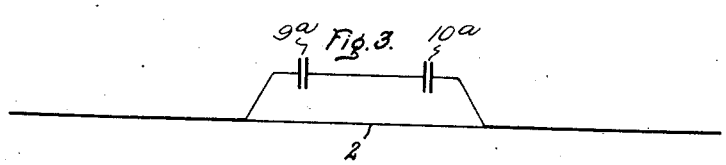
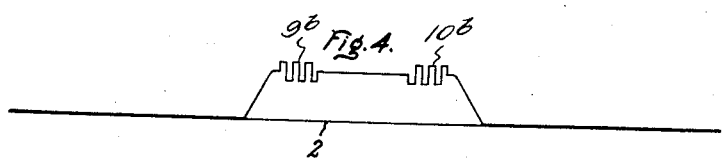
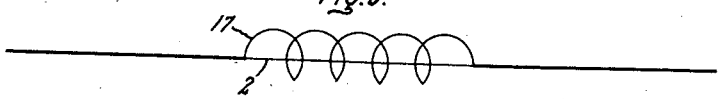
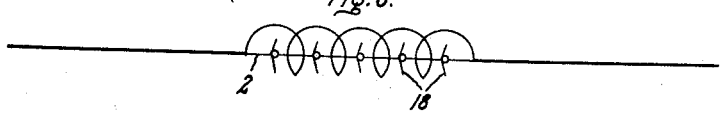
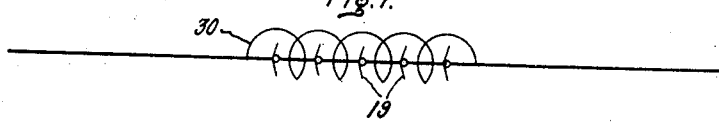
Inventor
Frank W. Peek Jr.
by *Alexander S. [signature]*
His Attorney.

June 18, 1929. F. W. PEEK, JR 1,717,850
ELECTRIC DISCHARGE DEVICE
Filed Dec. 19, 1925   3 Sheets-Sheet 2
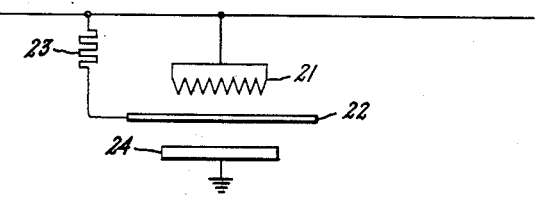
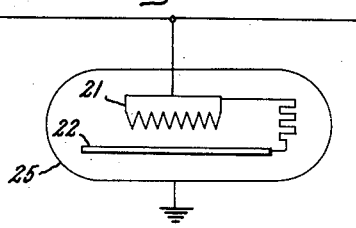
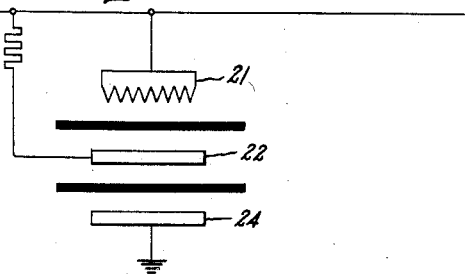
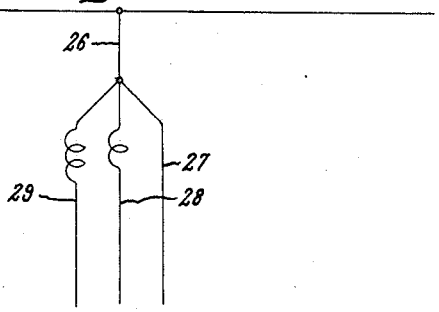
Inventor
Frank W. Peek Jr.
by *Alexander S. [illegible]*
His Attorney.

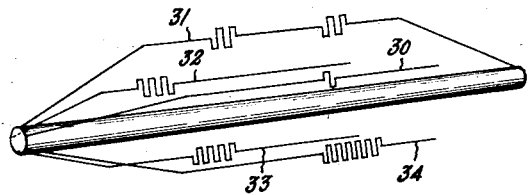
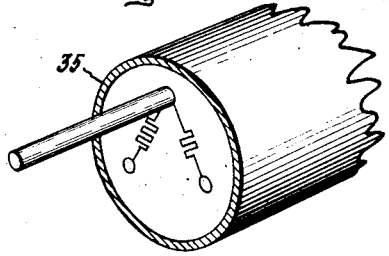
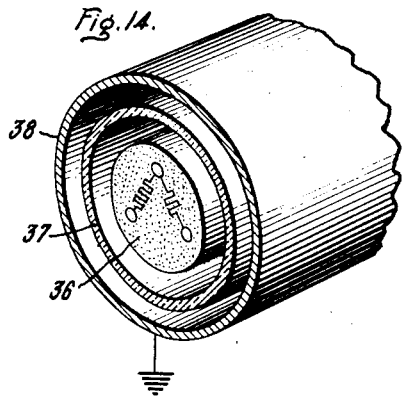
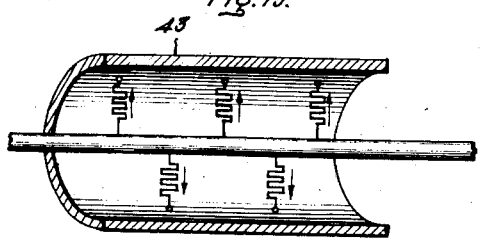
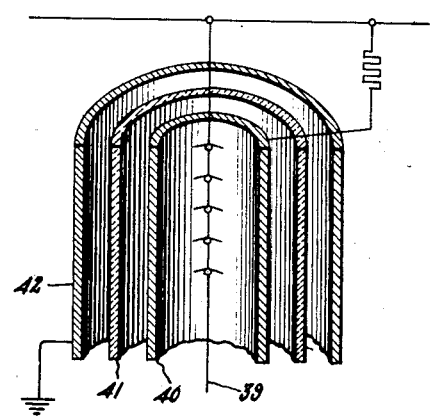

Patented June 18, 1929.

1,717,850

UNITED STATES PATENT OFFICE.

FRANK W. PEEK, JR., OF PITTSFIELD, MASSACHUSETTS, ASSIGNOR TO GENERAL ELECTRIC COMPANY, A CORPORATION OF NEW YORK.

ELECTRIC DISCHARGE DEVICE.

Application filed December 19, 1925. Serial No. 76,559.

My invention relates to means for the protection of electrical installations, such as transmission lines, from dangerously high voltages which make their appearance due to lightning or other causes.

I have found that high voltage surges, such as above indicated, may be dissipated from the line into the surrounding medium as, for example, by inducing corona discharges or dielectric losses or resistance losses and the like when such surges appear and, further, that dissipation of the normal operating energy may be prevented under the normal operating voltages of the system. I find that these results may be obtained, for example, by splitting up, so to speak, a section of the line into two or more multiple branches having dissimilar impedances, said impedances being of such values that while at operating voltages the branches are at approximately equal potential, yet when a surge, for example, appears on the line, a difference of potential is created between the branches with the result that the energy of the surge is dissipated along the branched section. Such an arrangement, I find, can be used in the construction of an effective discharge device or lightning arrester. Discharge devices involving the foregoing principle of operation may be made in a variety of forms, some of which are indicated in the accompanying drawings. However, I do not wish to be limited to these particular forms of construction since, in view of the disclosure, modifications will readily suggest themselves without departing from the spirit of the invention or from the scope of the claims contained herein.

The object of my invention, therefore, is to provide a device by means of which it becomes possible to dissipate the energy of a surge or wave from a line by creating a difference of potential along two neighboring conductors which during normal operating conditions are maintained at approximately equal potentials or at potentials insufficient to produce losses of the character indicated.

The means for accomplishing the foregoing are hereinafter more fully set forth and claimed, reference being had to the accompanying drawings in which:—

Fig. 1 shows one form of the device or arrester in which a strand of wire is connected in series with one branch of a three-phase line, for example, and located within the field of influence of a second strand also connected in series with the line through an impedance;

Fig. 2 shows a form of the arrester in which a greater number of strands are used. This form of arrester differs from the form shown in Fig. 1 in that the additional strand has a higher impedance than the second strand;

Fig. 3 shows another form of the arrester in which condensers are substituted for the inductance shown in Fig. 1;

Fig. 4 shows another form of the arrester in which resistances are substituted for the inductance of Fig. 1;

Fig. 5 shows another form of the arrester in which one of the strands is helically wound about the other;

Fig. 6 represents a modification of the form of arrester shown in Fig. 5 in which the central strand is provided with metal points or barbs;

Figs. 7 through 16 show other forms of the device.

Referring more in detail to the drawings, it will be seen that in the types of arrester shown in Figs. 1 through 6 the branch conductors or strands 2 and 3 are inserted in series with the line between the sections 7 and 8. These strands may be of various sizes. In the form shown in these figures, the strands are considerably smaller than are the adjacent sections 7 and 8 of the line between which the strands are inserted, the object being in these particular forms to facilitate the formation of the corona, or brush, discharge under proper conditions. With the construction indicated in Fig. 1, for example, the conductors 2 and 3 serve as shields for one another during the maintenance of normal operating conditions. In strand 3, Fig. 1, the loops 9 and 10 indicate impedance in the form of inductance. Strand 2 is represented as having no impedance or a much lower impedance than branch 3. However, the impedance in the branch 3 is selected so that at normal operating voltage and frequencies, such as 60 cycles, the potentials of all of the branches for all practical purposes are substantially the same and too low to cause discharges from the conductors. The result is that under normal operating conditions no substantial loss of the kind contemplated, such as corona discharge, will take place even though it be considered that the strands 2 and 3 may be very much smaller in size than either of the conductors 7 and 8. However, when lightning, for example, appears upon the line, its energy is dissipated as it branches along the branching paths, inasmuch as a sufficient difference of potential is created due to the presence of the impedance in the branch 3. The result is that a corona discharge is then established along the conductor having the higher potential. It will be seen that first a high potential appears in the branch 2 and the energy is dissipated there, and that then a delayed voltage appears along branch 3 whereupon a discharge also takes place along wire 3 if the delayed wave is of sufficiently high voltage. Obviously, therefore, under normal operating conditions, inasmuch as the potentials in the two branches are substantially the same, no substantial loss will take place, but when a surge or steep wave appears the divided energy becomes discharged.

It will be understood, therefore, that with a given electrical condition, such as that present under normal operating conditions, a wire may be so small that a corona discharge will take place. But with the same electrical condition a number of wires of the same size, three for example, may be located in multiple, and their mutual action will prevent corona formation. This may continue to be the case even though some of the conductors are connected to the first one through impedances, as in Figs. 1 and 2. This multiple arrangement of wires, such as in Figs. 1 and 2, may now be considered as a single conductor.

But if the electrical conditions are changed as, for example, when a lightning surge appears on the line, the impedance holds back the surge from those branches that have impedance but not from the conductor without impedance and, therefore, the action is as though there were only one small conductor, and the result is a manifestation of corona. Therefore, the multiple conductor may be considered as a conductor having a differential corona characteristic such that the critical corona voltage is high under normal operating conditions and comparatively low during surge conditions.

With an arrester arranged as indicated in Fig. 2, when an undesired wave appears the conductor 2 having a minimum impedance will discharge first, then a discharge will take place along strand 3, and later a discharge will take place along strand 4.

The device may be arranged as indicated in Fig. 5, in which case the condensers 9$^a$ and 10$^a$ take the place of the impedances 9 and 10 of Fig. 1.

The device may also be arranged as indicated in Fig. 4, in which case non-inductive resistance elements 9$^b$ and 10$^b$ take the place of the impedance elements 9 and 10 of Fig. 1.

In Fig. 5 I have indicated how the strand 2 may be shielded by the strand 17 helically wound about the strand 2. In this case the convolutions in the strand 17 furnish sufficient impedance so that when a surge appears upon the line a corona discharge takes place along strand 2.

In Fig. 6 I have indicated how strand 2 may be supplied with barbs 18.

In Fig. 7 I have indicated how the line conductor itself may be provided with barbs 19 which are shielded by a helically wound strand 30 similar to the strand 17 in Fig. 5.

A form of arrester using the same differential principle is illustrated in Fig. 8, wherein a serrated metal element 21 is connected directly to the line and is shielded by a metal element 22 which may be connected to the line through the impedance element 23. Below the element 22 there is provided a metal plate 24 which is connected to ground G. Under normal operating conditions the element 22 shields the prongs of the element 21, inasmuch as the impedance 23 is not sufficient to cause an appreciable difference of potential between conductors 21 and 22. However, upon the appearance of a surge upon the line, a difference of potential is built up and a discharge takes place.

In Fig. 9 I have indicated how the arrangement shown in Fig. 8 may be immersed in oil, such as transformer oil, in a tank 25, the tank being grounded as indicated. With the arrangement shown in Fig. 8, it is also possible to insert a solid dielectric element between either the elements 21 and 22 or 22 and 24, as indicated in Fig. 10. Furthermore, if desired, a condenser element may be interposed between the element 24 and ground.

Referring to the type of discharge device shown in Fig. 8, the operation of this device may be explained as follows: Inasmuch as the plate 21 is serrated, if plate 22 were not provided, a brush discharge might take place even with operating voltage on the line. However, by introducing plate 22 in front of the serrated surface, a brush discharge is prevented inasmuch as there is no substantial difference of potential between the plates 21 and 22. However, when a surge appears on the line a difference of potential is created between plates 21 and 22 due to the presence of the impedance 23 with the result that a brush discharge takes place between the two plates. However, as soon as the surge voltage disappears, the difference of potential between the plates 21 and 23 again disappears and the discharge stops.

The arrangement in Fig. 11 involves the use of a branch 26 from the line, from which branch in turn a number of strands 27, 28, and 29 branch off, each of the strands having a different electrical characteristic in order that any abnormal surge or wave will induce a discharge.

In Fig. 12 the line conductor is indicated as being larger than the surrounding conductors 30, 31, 32, 33 and 34. Each of these conductors is connected with the line through a resistance as indicated so as to insure a difference in the electrical characteristics of the branches. With this arrangement, the losses are due to corona and resistance.

In Fig. 13 the same ararngement is used except that the conductors are encircled by a dielectric body 35. With this arrangement, the liability that a dynamic discharge may take place from one phase line to the other is minimized. Furthermore, not only are the corona and resistance losses produced, but dielectric losses are also set up in the element 35 when a surge appears.

Fig. 14 shows a construction in which the conductors are surrounded by solid material 36 in which latter the losses take place. Beyond the element 36 brush discharges may take place and again a second dielectric 37 is interposed so as to minimize the probability of a dynamic discharge. Within the element 37 dielectric losses will also take place. Beyond the element 37 brush discharge may again take place and beyond that a conductor 38 is provided which may be connected to ground.

Fig. 16 shows a modification of the device shown in Figs. 10 and 11. In this figure the branch 39 is connected to the line and provided with barbs. The branch 39 is surrounded by a metallic element 40 which is connected to the line through a suitable impedance. The metallic element 40 is in turn surrounded by a dielectric element 41 which latter in turn is surrounded by a metallic element 42 connected to ground. With this construction, when a surge appears on the line, a brush discharge takes place between the elements 39 and 40, the element 41 serving to minimize the danger of a dynamic discharge between different phase conductors of the system, which element 41 also serves to absorb energy from the line in the form of dielectric losses.

In Fig. 15 there is shown another modification in which the main line conductor is surrounded by a metallic shield 43 between which latter and the line a series of connections are provided involving resistances. Each of these resistances serves to absorb a part of the energy of the surge, the tendency of the surge being always to pass outward toward the larger circumference of the element 43, from which latter further dissipation may take place.

With reference to Fig. 4, it will be understood that inasmuch as the two branches of the circuit are different, inherently the capacitance of the two branches is different, and that therefore a differential action with respect to the corona effect is insured. Obviously the high resistance delays the maximum charging of the branch in which the resistance is located.

What I claim as new and desire to secure by Letters Patent of the United States is:

1. A line adapted to be connected to a source of operating potential and adapted also to receive an electric surge, a comparatively small branch conductor and a second branch conductor, both connected with said line, said branches being also located within the electric field of influence of each other whereby a corona discharge is prevented from forming due to the operating voltage, said second branch having sufficient impedance whereby when the surge appears on the line a difference of potential is created in the two branches and electric losses are induced thereby.

2. A line adapted to be connected to a source of operating potential and adapted also to receive a transient charge, a comparatively small branch conductor and a second branch conductor, said first and second branches being both connected with said line, said branches being also located within the electric field of influence of each other, whereby a corona discharge is prevented from forming due to the operating voltage, said second branch having sufficient impedance whereby when the transient charge appears on the line, a difference of potential is created in the two branches and a corona discharge established in one of the branches, said branch conductors being inserted in series with the line.

3. A line adapted to be connected to a source of operating potential and adapted also to receive a transient electric charge, a comparatively small branch conductor and a second branch conductor, said first and second branches being both connected with said line, said branches being also located within the electric field of influence of each other, whereby a corona discharge is prevented from forming due to the operating voltage, said second branch having sufficient impedance whereby when the transient charge appears on the line a difference of potential is induced in the two branches whereby a corona discharge takes place in one of the branches, said branch conductors being connected in multiple with each other and in series with the line.

4. In combination with a transmission line to which a source of operating potential may be connected, a pair of conductors located in inductive relation to each other and connected to the line in multiple, thereby maintaining its operating voltages in the two branches substantially equal, one of said conductors being small enough to form a brush discharge under the operating potential of the line and the other conductor serving to prevent such discharge, said other conductor possessing sufficient impedance to an electric surge appearing on the line to create a difference of potential between the two branches whereby a brush discharge may take place over the first conductor, said impedance being insufficient to maintain the discharge when the surge disappears and the operating voltage remains.

5. A line adapted to be connected to a source of normal operating potential and adapted also to receive a surge of potential having a substantially higher frequency than the operating frequency, said line in combination with a comparatively small branch conductor and a second branch conductor, said first and second branches being both connected with said line, said branches being also located within the field of influence of each other and maintained at the same operating potential whereby the dissipation of operating energy is minimized under normal operating conditions, said second branch having sufficient impedance whereby when the surge appears on the line a difference of potential is created between the two branches sufficient to produce a corona discharge from one of the branches.

6. A line adapted to be connected to a source of normal operating potential and adapted also to receive a surge of potential having a substantially higher frequency than the operating potential, said line in combination with a comparatively small branch conductor and a second branch conductor, said first and second branches being both connected with said line, said branches being also located within the field of influence of each other and maintained at the operating potential whereby the dissipation of the operating energy under normal operating conditions is minimized, said second branch having impedance such that when the surge appears on the line a corona discharge is established in one of the branches, said branch conductors being inserted in series with the line.

7. In combination with a transmission line to which a source of operating potential may be connected, a pair of conductors located in inductive relation to each other and connected to the line in multiple and normally maintained at operating voltages in phase, one of said conductors being small enough to form a brush discharge under the operating potential of the line and the other conductor serving to prevent such discharge under normal operating conditions, said other conductor possessing an impedance to a wave different from the operating wave sufficient to cause a brush discharge to take place over the first conductor but suppressed when the voltages in the two conductors approach each other in value.

8. A device for dissipating electric energy comprising a line adapted to be connected to a source of potential, branch lines connected to said line, each branch having a different impedance, said branches being located within the electric field of influence of each other, and free ends of conductors associated with one of said lines for facilitating the formation of corona.

9. A device for dissipating electric energy comprising a line adapted to be connected to a source of potential, branch lines connected to said line, each branch having a different impedance, said branches being located within the electric field of influence of each other, and means associated with one of said lines for facilitating the formation of corona, said means being in the form of conductors having surfaces that slope toward each other.

10. In combination, a transmission line adapted to be connected with a source of normal operating potential, a device for dissipating electric energy comprising a pair of conductors branching from a common point, said branches located within their mutual electric fields of influence and each being enveloped by a dielectric, said branches having different electric characteristics such that under normal operating conditions the branches remain at potentials insufficient to produce substantial dissipation of the operating energy but such that when transient voltages appear on the line a difference of potential is created between the branches whereby the transient energy is dissipated in the dielectric.

11. A device for dissipating electric energy, said device comprising a pair of conductors, said conductors being so related and having such electric characteristics as to insure for the device a differential corona characteristic such that when the device is connected to a line connected to a source of potential the critical corona voltage is high under normal voltage conditions of the line and lower during surge conditions upon the line.

12. In combination with a transmission line connected with a source of potential, a device for dissipating electric energy comprising a pair of conductors located within interlocked electric fields, said conductors having different electric characteristics such that as a whole the device is given a differential corona characteristic.

In witness whereof, I have hereunto set my hand this 17th day of December, 1925.

FRANK W. PEEK, Jr.

CERTIFICATE OF CORRECTION.

Patent No. 1,717,850.  Granted June 18, 1929, to

FRANK W. PEEK, JR.

It is hereby certified that error appears in the printed specification of the above numbered patent requiring correction as follows: Page 2, line 62, for "Fig. 5" read "Fig. 3"; page 3, line 12, for the misspelled word "ararngement" read "arrangement"; and that the said Letters Patent should be read with these corrections therein that the same may conform to the record of the case in the Patent Office.

Signed and sealed this 6th day of August, A. D. 1929.

M. J. Moore,
Acting Commissioner of Patents.

(Seal)